(12) United States Patent
Xu

(10) Patent No.: US 10,954,324 B2
(45) Date of Patent: Mar. 23, 2021

(54) CATALYST COMPONENT FOR HIGH ACTIVITY AND HIGH STEREOSELECTIVITY IN OLEFIN POLYMERIZATION

(71) Applicant: Formosa Plastics Corporation, U.S.A., Livingston, NJ (US)

(72) Inventor: Demin Xu, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 94 days.

(21) Appl. No.: 15/810,756

(22) Filed: Nov. 13, 2017

(65) Prior Publication Data

US 2018/0066084 A1    Mar. 8, 2018

Related U.S. Application Data

(62) Division of application No. 13/424,165, filed on Mar. 19, 2012, now Pat. No. 9,815,918.

(51) Int. Cl.
*C08F 110/06*   (2006.01)

(52) U.S. Cl.
CPC ........ *C08F 110/06* (2013.01); *C08F 2410/01* (2013.01)

(58) Field of Classification Search
None
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,220,554 A | 9/1980 | Scata' et al. |
| 4,226,963 A | 10/1980 | Giannini et al. |
| 4,294,721 A | 10/1981 | Cecchin et al. |
| 4,314,911 A | 2/1982 | Giannini et al. |
| 4,315,835 A | 2/1982 | Scata' et al. |
| 4,330,648 A | 5/1982 | Welch |
| 4,330,649 A | 5/1982 | Kioka et al. |
| 4,347,160 A | 8/1982 | Epstein et al. |
| 4,382,019 A | 5/1983 | Greco |
| 4,435,550 A | 3/1984 | Ueno et al. |
| 4,439,540 A | 3/1984 | Cecchin et al. |
| 4,465,782 A | 8/1984 | McKenzie |
| 4,474,703 A | 10/1984 | Bujadoux et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,657,882 A | 4/1987 | Karayannis et al. |
| 4,816,433 A | 3/1989 | Terano et al. |
| 4,978,648 A | 12/1990 | Barbe' et al. |
| 4,990,479 A | 2/1991 | Ishimaru et al. |
| 5,208,302 A | 5/1993 | Nakajo et al. |
| 5,902,765 A | 5/1999 | Takahashi et al. |
| 5,948,872 A | 9/1999 | Kioka et al. |
| 6,121,483 A | 9/2000 | Fushimi et al. |
| 6,770,586 B2 | 8/2004 | Tashino et al. |
| 2002/0016255 A1* | 2/2002 | Job ................ C08F 10/00 502/113 |

FOREIGN PATENT DOCUMENTS

| | | |
|---|---|---|
| CN | 1040379 A | 3/1990 |
| CN | 1837247 A | 9/2006 |
| EP | 0350170 A2 | 1/1990 |
| EP | 0361494 A2 | 4/1990 |
| EP | 0622380 A1 | 11/1994 |
| EP | 0728769 A1 | 8/1996 |
| WO | 86/00625 A1 | 1/1986 |
| WO | 89/12649 A2 | 12/1989 |

OTHER PUBLICATIONS

Busico, Vincenzo, et al. "Full assignment of the 13C NMR spectra of regioregular polypropylenes: methyl and methylene region." Macromolecules 30.20 (1997): 6251-6263.
Knickmeier, Markus, Gerhard Erker, and Thomas Fox. "Conformational Analysis of Nonbridged Bent Metallocene Ziegler-Catalyst Precursors Detection of the Third Torsional Isomer." Journal of the American Chemical Society 118.40 (1996): 9623-9630.

* cited by examiner

*Primary Examiner* — Aileen B Felton
(74) *Attorney, Agent, or Firm* — Jones Walker LLP

(57) ABSTRACT

What is disclosed is a method for preparing a catalyst system and a catalyst system for polymerizing or copolymerizing an α-olefin. Catalyst component (A) is obtained by a process of reacting a magnesium complex (A-1) containing acid salts of group IB-VIIIB elements formed by contacting a magnesium halide with an acid salt solution of group IB-VIIIB metals or spherical particles adducts, an internal electron donor (A-2) of diester or diether or composite compounds, and a titanium compound (A-3). The catalyst compound (A) is contacted with a silicon compound (B) and an organo-aluminium compound (C) to complete the catalyst system providing a good balance of catalyst performance in terms of activity and stereo-specificity.

13 Claims, No Drawings

CATALYST COMPONENT FOR HIGH ACTIVITY AND HIGH STEREOSELECTIVITY IN OLEFIN POLYMERIZATION

CROSS REFERENCE TO RELATED APPLICATIONS

This application is a divisional of U.S. Nonprovisional application Ser. No. 13/424,165 filed Mar. 19, 2012, which is incorporated by reference herein in its entirety.

BACKGROUND

1. Field of the Invention

The present invention relates to new catalyst components for the polymerization of olefin comprising magnesium halide and salt of IB-VIIIB elements, titanium halide and internal donors.

2. Description of the Related Art

The modern Ziegler Natta catalysts comprising magnesium halide, titanium halide and internal donors are well known in art and has been prepared by various methods. One method consists of co-grinding the magnesium halide with internal electron donors until the product shows a surface area higher than 20 m²/g and thereafter reacting the ground product with the Ti compound. These methods of preparing solid Ziegler-Natta type catalyst components are disclosed in U.S. Pat. Nos. 4,220,554; 4,294,721; 4,315,835; 4,330,649; 4,439,540; 4,816,433; and 4,978,648. Another method known in the art describes reaction of titanium tetrachloride compounds with organoaluminum halides in the presence of magnesium halide composite to prepare catalyst components, which is described in U.S. Pat. Nos. 4,330,648; 4,314,911; and 4,474,703; WO/8912649; WO/8600625; and CN 1837247. However, these catalyst components are not satisfactory in terms of polymerization activity and stereo-specificity of resulting polymer chain.

There have also been efforts to achieve balanced catalyst properties in terms of activity and stereo-specificity. Mitsui Petrochemical Industries, Ltd. have published olefin polymerization catalysts employing specific silicon compounds which has improved polymerization activities and stereo-specificity (e.g., U.S. Pat. No. 4,990,479, EP 0350170 B2, and CN 1040379) remarkably compared to those of the conventional catalyst components. The presence of electron donors have also been found to allow preparation of catalyst components endowed not only with high activity, but also with a high stereo-specificity and solid catalysts have been prepared with internal electron donors. Common internal electron donor compounds, incorporated in the solid Ziegler-Natta catalysts components during preparation of such catalysts include ethers, ketones, amines, alcohols, phenols, phosphines, and silanes. Also, external electron donors have been employed simultaneously with solid catalyst components for olefin polymerization to improve stereo-specificity and organosilicon compounds are commonly used as external electron donors. Examples of such catalyst system are described in U.S. Pat. Nos. 4,107,414; 4,186,107; 4,226,963; 4,347,160; 4,382,019; 4,435,550; 4,465,782; 4,522,930; 4,530,912; 4,532,313; 4,560,671; 4,657,882; 5,208,302; 5,902,765; 5,948,872; 6,121,483; and 6,770,586. EP 0361494 B1 discloses solid catalyst components comprising, as an internal donor, 1,3-diether, which is capable of forming complexes with magnesium halide and TiCl₄ in such a way that the solid catalyst components can achieve good results in terms of good activity and stereo-specificity. EP 0622380 B2 demonstrates that the solid catalyst components containing 1,3-diether produces polymers having very high melt flow rates with good activity while EP 0728769 B1 refers to electron donors of cyclopolyenic 1,3-diethers conferring a further increase of activity. Notwithstanding the good polymerization activity as well as stereo-specificity of the catalyst components containing various electron donors, the balance of properties still should be improved in terms of catalyst activity and stereo-specificity.

SUMMARY OF THE INVENTION

The present invention provides a method for polymerizing or copolymerizing an α-olefin using the catalyst system consisting of:

[1] a catalyst component (A) obtained by a process comprising reactions contacting a magnesium complex (A-1) containing acid salts of group IB-VIIIB elements formed by contacting magnesium halide either as a solid or in a liquid medium represented by formula $MgX_n(OR)_{2-n}$ with an acid salt solution of group IB-VIIIB metals represented by formula $M_mY_p$, with internal electron donor (A-2) of diester or diether or composite compounds and titanium compound (A-3) of the general formula $Ti(OR)_lX'_{4-l}$, where X' is a halogen atom; M is at least one metal selected from group IB-VIIIB; X and Y are acid radicals such as $Cl^-$, $Br^-$, $I^-$, $NO_3^-$, $NO_2^-$, $RCOO^-$, $SO4^{2-}$, $ClO_3^-$, $BrO_3^-$, $IO_3^-$, $ClO_4^-$, $R(COO)_2^{2-}$; R is a hydrocarbon group having from 1 to 10 carbon atoms; n is an integer from 0 to 2; m and p are numbers from 1.0 to 5.0; l is a number from 0 to 4; and

[2] a silicon compound represented by the general formula: $SiR_l(OR')_{4-l}$ and $SiR_l(NR2')_{4-l}$, wherein R is hydrogen, an alkyl group, or an aryl group; R' is alkyl group or aryl group, and l is a number from 0 to 4; and

[3] an organoaluminium compound.

The obtained catalyst components are able to offer a good balance of catalyst performance in terms of activity and stereo-specificity. One of the advantages of the obtained catalyst components of the present invention is that it can produce polyolefins, particularly polypropylene and its copolymers, with minimized solvent extractable, which consequently increases the product physical properties. Heptane insoluble (HI %) and $^{13}C$ NMR results of resonances associated with different pentads exhibit the improved solvent insolubility and isotacticity.

DETAILED DESCRIPTION

Catalyst components (A) of the present invention can be prepared by a process comprising formation of magnesium complex (A-1) containing acid salts of group IB-VIIIB elements and subsequent contact with internal electron donors (A-2) and titanium compound (A-3).

In one embodiment of present invention, magnesium complex (A-1) containing acid salts of group IB-VIIIB elements can be prepared co-crystallization or solidification from a solution containing both magnesium halide represented by formula $MgX_n(OR)_{2-n}$ and acid salts of group IB-VIIIB elements represented by formula $M_mY_p$. For example, magnesium halide and a transition metal halide can be dissolved together in a solvent like alkyl alcohol or alkyl ether to form a solution containing both the magnesium halide and the transition metal halide and then solidified together either by lowering temperature or introducing into a hydrocarbon medium. The catalyst components (A) can then be obtained by subsequent contact reaction of solid forms of magnesium complex (A-1) with internal electron donor (A-2) and titanium compound (A-3).

In another embodiment of present invention, magnesium complex (A-1) solution is formed by dissolving magnesium halide, acid salts of group IB-VIIIB, and internal electron donor (A-2) together in a solvent such as alcohol, ether, or phosphorus compound, and can then be contacted directly by titanium compound (A-3) to precipitate the catalyst components (A). For example, magnesium chloride ($MgX_2$), transition metal halide ($M_mY_p$), and internal electron donor (A-2) can be dissolved together in ethyl alcohol to form a solution and then titanium compound (A-3) is charged directly into the solution to precipitate the solid catalyst component (A). The metal salt compounds ($M_mY_p$) is used in the ratio of 0.01 to 50 mol per magnesium halide, preferably 0.05 to 10 mol per mol magnesium halide, and the titanium compound is used in an amount 0.01 to 1000 mol per mol magnesium halide, preferably 0.1 to 200 mol per mol magnesium halide.

The solid titanium catalyst component (A) obtained as above contains, as its essential ingredients, metal, titanium, halogen, and an electron donor. In this solid catalyst component (A), an atomic ratio of halogen/titanium is about 2 to 200, preferably about 4 to 100; a molar ratio of the electron donor/titanium is about 0.01 to 100, preferably about 0.2 to 10; and an atomic ratio of metal/titanium is about 1 to 100, preferably about 2 to 50.

Typical examples of acid salts of group IB-VIIIB compounds represented by formula $M_mY_p$ which may be employed for the present invention are: cerium (III) fluoride, cerium (III) chloride, cerium (III) bromide, cerium (III) iodide, chromium (II) fluoride, chromium (II) chloride, chromium (II) bromide, chromium (II) iodide, chromium (III) fluoride, chromium (III)chloride, chromium (III)bromide, chromium (III) iodide, chromium (III) nitrate, cobalt (II) fluoride, cobalt (II) chloride, cobalt (II) bromide, cobalt (II) iodide, copper (II) fluoride, copper (II) chloride, copper (II) bromide, copper (II) iodide, copper (II) nitrate, dysprosium (II) chloride, dysprosium (II) bromide, dysprosium (II) iodide, dysprosium (III) fluoride, dysprosium (III) chloride, dysprosium (III) bromide, dysprosium (III) iodide, erbium fluoride, erbium chloride, erbium bromide, erbium iodide, erbium nitrate, europium (II) fluoride, europium (II) chloride, europium (II) bromide, europium (II) iodide, europium (III) fluoride, europium (III) chloride, europium (III) bromide, europium (III) iodide, gadolinium (II) chloride, gadolinium (III) fluoride, gadolinium (III) chloride, gadolinium (III) bromide, gadolinium (III) iodide, gadolinium (III) nitrate, gold (III) fluoride, gold (III) chloride, gold (III) bromide, gold (III) iodide, holmium fluoride, holmium chloride, holmium bromide, holmium iodide, iron (II) fluoride, iron (II) chloride, iron (II) bromide, iron (II) iodide, iron (III) fluoride, iron (III) chloride, iron (III) bromide, iron (III) iodide, iron (II) nitrate, iron (III) nitrate, Iron (II) sulfate, Iron (II) perchlorate, lanthanum fluoride, lanthanum chloride, lanthanum bromide, lanthanum iodide, lanthanum nitrate, lutetium fluoride, lutetium chloride, lutetium bromide, lutetium iodide, manganese (II) fluoride, manganese (II) chloride, manganese (II) bromide, manganese (II) iodide, manganese (II) acetate, manganese (II) nitrate, molybdenum (II) fluoride, molybdenum (II) chloride, molybdenum (II) bromide, molybdenum (II) iodide, molybdenum (III) fluoride, molybdenum (III) chloride, molybdenum (III) bromide, molybdenum (III) iodide, neodymium fluoride, neodymium chloride, neodymium bromide, neodymium iodide, neodymium nitrate, nickel (II) fluoride, nickel (II) chloride, nickel (II) bromide, nickel (II) iodide, nickel (II) nitrate, niobium (III) fluoride, niobium (III) chloride, niobium (III) bromide, osmium (III) chloride, osmium (III) bromide, palladium (II) fluoride, palladium (II) chloride, palladium (II) bromide, palladium (II) iodide, palladium (II) nitrate, praseodymium fluoride, praseodymium chloride, praseodymium bromide, praseodymium iodide, praseodymium nitrate, rhenium (III) fluoride, rhenium (III) chloride, rhenium (III) bromide, rhenium (III) iodide, rhodium (III) fluoride, rhodium (III) chloride, rhodium (III) bromide, rhodium (III) iodide, rubidium fluoride, rubidium chloride, rubidium bromide, rubidium iodide, rubidium nitrate, ruthenium (III) fluoride, ruthenium (III) chloride, ruthenium (III) bromide, ruthenium (III) iodide, samarium (II) fluoride, samarium (II) chloride, samarium (II) bromide, samarium (II) iodide, samarium (III) fluoride, samarium (III) chloride, samarium (III) bromide, samarium (III) iodide, scandium fluoride, scandium chloride, scandium bromide, scandium iodide, scandium nitrate, thulium fluoride, thulium chloride, thulium bromide, thulium iodide, thulium nitrate, tungsten (II) chloride, tungsten (II) bromide, tungsten (II) iodide, tungsten (III) bromide, tungsten (III) iodide, vanadium (II) fluoride, vanadium (II) chloride, vanadium (II) bromide, vanadium (II) iodide, vanadium (III) fluoride, vanadium (III) chloride, vanadium (III) bromide, vanadium (III) iodide, ytterbium (II) chloride, ytterbium (II) bromide, ytterbium (II) iodide, ytterbium (III) fluoride, ytterbium (III) chloride, yttrium fluoride, yttrium chloride, yttrium bromide, yttrium nitrate, zinc fluoride, zinc chloride, zinc bromide, zinc iodide, zinc nitrate, zinc acetate, zinc chlorate, zinc perchlorate, and zirconyl chloride.

Other examples of acid salts of group IA-VA compounds that may also be used in the present invention and are represented by formula $M_mY_p$ are: aluminum fluoride, aluminum chloride, aluminum bromide, aluminum iodide, aluminum nitrate, lithium fluoride, lithium chloride, lithium bromide, lithium iodide, lithium nitrate, lithium acetate, lithium metaborate, lithium chlorate, lithium perchlorate, magnesium fluoride, magnesium chloride, magnesium bromide, magnesium iodide, magnesium acetate, magnesium nitrate, magnesium perchlorate, magnesium sulfate, magnesium chlorate, magnesium bromate, magnesium iodate, tin (II) fluoride, tin (II) chloride, tin (II) bromide, tin (II) iodide, tin (IV) fluoride, tin (IV) chloride, tin (IV) bromide, and tin (IV) iodide.

Magnesium halide compounds that may also be used in the present invention and are represented by formula $MgX_n(OR)_{2-n}$ are: magnesium fluoride, magnesium chloride, magnesium bromide, magnesium iodide, magnesium acetate, magnesium nitrate, magnesium perchlorate, and magnesium sulfate. Besides those magnesium compounds, complex compounds or double compounds of these magnesium compounds can be used with metal salt compounds, or mixtures of these magnesium compounds with other metal salt compounds. The magnesium compounds may be used in combination of two or more kinds of metal salt compounds. Various metal salt compounds other than those mentioned above can also be used for preparing the solid catalyst component (A), but it is preferred that the magnesium compound is present in the form of a halogen-containing magnesium compound in the solid catalyst component (A) finally obtained. The compositions obtained according to the aforementioned processes in the preparation of the catalyst component may be further brought into contact one or more times with the titanium compound, and also may be washed with an organic solvent.

According to a preferred embodiment of the present invention, internal electron donor (A-2) can also be used to make the catalyst component (A) either as a single compound or as combination with two or three compounds. The electron donor compound (A-2) improves the stereo-specificity and activity of the catalyst components of present invention. The electron donor compound (A-2) which can be used for the present invention includes oxygen-containing electron donors, for example, alcohols, phenols, ketones, aldehydes, carboxylic acids, malonic acid, esters of organic acids or inorganic acids, ethers such as monoethers, diethers or polyethers, etc.; and nitrogen-containing electron donors such as ammonia, amines, nitriles, isocyanates. Also, dialkyl esters derived from dicarboxylic acids such as phthalic acid, naphthalene dicarboxylic acid, malic acid, succinic acid, Glutaric acid, and diols such as 1,2-diols, 1,3-diols, 1,4-diols, 1,5-diols, and diethers derived from diols can also be used in accordance with the teachings the present invention.

Preferred electron donor compounds (A-2) include polycarboxylates and diethers, and more preferred are esters of aromatic polycarboxylates and 1,3 diethers. The most preferred electron donor compounds (A-2) are esters of aromatic dicarboxylates and cyclopolyenic 1,3 diethers or 2-substituted 1,3 diethers. Specific examples of suitable aromatic polycarboxylates compounds are: phthalic acid naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid, indane-5,6-dicarboxylic acid, etc., in which the alkyl groups may be any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-ethylpentyl, and 3-ethylpentyl groups. Preferably, the organic group in the ester moiety of these esters is a linear or branched aliphatic hydrocarbon residue having at least 4 carbon atoms.

Specific examples of suitable disubstituted malonate compounds are: diethyl-2(1-trifluoromethylethyl)-2-benzylmalonate, diethyl 2-(1-trifluoromethylethyl)-2-methylmalonate, diethyl 2-methyltrimethylsilyl-2-methylmalonate, diethyl 2-p-chlorobenzyl-2-isopropylmalonate, diethyl 2-piperidyl-2-methylmalonate, diethyl 2-(1-trifluoromethyl-1-methylethyl)-2-methylmalonate, and bis(2-trimethylsilylethyl) 2-isopropyl-2-isobutylmalonate bis(p-chlorobenzyl) 2-cyclohexyl-2-methylmalonate.

Particularly preferred are disubstituted succinate compounds: diethyl 2,2-dimethylsuccinate, diethyl 2-ethyl-2-methylsuccinate, diethyl 2-benzyl-2-isopropylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl-2-methylsuccinate, diethyl 2,2-diisopropyl diethyl 2-isobutyl-2-ethylsuccinate, diethyl 2-(1,1,1-trifluoro-2-propyl)-2-methylsuccinate, diethyl 2-isopentyl-2-isobutylsuccinate, diethyl 2-phenyl-2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-(cyclohexylmethyl)-2-isobutylsuccinate, diisobutyl 2-cyclopentyl-2-n-propylsuccinate, diisobutyl 2,2-diisobutylsuccinate, diisobutyl 2-cyclohexyl-2-ethylsuccinate, diisobutyl 2-isopropyl-2-methylsuccinate, diisobutyl 2-isobutyl-2-ethylsuccinate, diisobutyl 2-(1,1,1-trifluoro-2-propyl)-2-methylsuccinate, diisobutyl 2-isopentyl-2-isobutylsuccinate, diisobutyl 2,2-diisopropylsuccinate, diisobutyl 2-phenyl-2-n-propylsuccinate, dineopentyl 2,2-dimethylsuccinate, dineopentyl 2-ethyl-2-methylsuccinate, dineopentyl 2-benzyl-2-isopropylsuccinate, dineopentyl 2-(cyclohexylmethyl)-2-isobutylsuccinate, dineopentyl 2-cyclopentyl-2-n-propylsuccinate, dineopentyl 2,2-diisobutylsuccinate, dineopentyl 2-cyclohexyl-2-ethylsuccinate, dineopentyl 2-isopropyl-2-methylsuccinate, dineopentyl 2-isobutyl-2-ethylsuccinate, dineopentyl 2-(1,1,1-trifluoro-2-propyl)-2-methylsuccinate, dineopentyl 2,2-diisopropylsuccinate, dineopentyl 2-isopentyl-2-isobutylsuccinate, and dineopentyl 2-phenyl-2-n-butylsuccinate.

Specific examples of suitable polycarboxylate compounds derived from diols are: 2,4-pentanediol di(m-chlorobenzoate), 2,4-pentanediol di(o-bromobenzoate), 2,4-pentanediol di(p-methylbenzoate), 2,4-pentanediol di(p-tert-butylbenzoate), 2,4-pentanediol di(p-butylbenzoate), 2,4-pentanediol monobenzoate monocinnamate, 2,4-pentanediol dicinnamate, heptan-6-ene-2,4-diol dibenzoate, 3,5-heptandiol dibenzoate, 2,6-dimethyl-3,5-heptandiol dibenzoate, 6-methyl-2,4-heptandiol dibenzoate, 6-methyl-2,4-heptandiol di(p-chlorobenzoate), 6-methyl-2,4-heptanediol di(p-methylbenzoate), 6-methyl-2,4-heptanediol di(m-methylbenzoate), 6-methyl-2,4-heptanediol dipivalate, 3-methyl-2,4-pentanediol di(p-chlorobenzoate), 3-methyl-2,4-pentanediol di(p-methylbenzoate), 3-butyl-2,4-pentanediol di(p-methylbenzoate), 3-methyl-2,4-pentanediol di(p-tert-butylbenzoate), 3-methyl-2,4-pentanediol monobenzonate monocinnamate, 3,3-dimethyl-2,4-pentandiol dibenzoate, 3,3-dimethyl-2,4-pentandiol monobenzonate monocinnamate, 3-ethyl-2,4-pentandiol dibenzoate, 3-butyl-2,4-pentandiol dibenzoate, 3-allyl-2,4-pentandiol dibenzoate, 4-methyl-3,5-heptandiol dibenzoate, 2-ethyl-1,3-hexandiol dibenzoate, 2,2,4-trimethyl-1,3-pentandiol dibenzoate, 4-methyl-3,5-octandiol dibenzoate, 5-methyl-4,6-nonandiol dibenzoate, 2-methyl-1,3-diphenyl-1,3-propylene-glycol dibenzoate, 1,3-diphenyl-1,3-propylene-glycol dipropionate, 2-methyl-1,3-diphenyl-1,3-propylene-glycol dipropionate, 2-methyl 1,3-diphenyl-1,3-propylene-glycol diacetate, 2,2-dimethyl-1,3-diphenyl-1,3-propylene-glycol dibenzoate, 2,2-dimethyl-1,3-diphenyl-1,3-propylene-glycol dipropionate, 2-methyl-1-phenyl-1,3-butandiol dibenzoate, 2-methyl-1-phenyl-1,3-butandiol dipivalate, heptan-6-ene-2,4-diol dipivalate, 2,2,4,6,6-pentamethyl-3,5-hexandiol dibenzoate, 1,3-di-tert-butyl-2-ethyl-1,3-propylene-glycol dibenzoate, 1,3-diphenyl-1,3-propylene-glycol diacetate, 2-(2-furyl)-2-methyl-1,3-butandiol dibenzoate, 1,1-di(acryloyloxymethyl)-3-cyclohexene 2-isoamyl-2-isopropyl-1,3-propylene-glycol dibenzoate, 2-isoamyl-2-isopropyl-1,3-propylene-glycol di(p-chlorobenzoate), 2-isoamyl-2-isopropyl-1,3-propylene-glycol di(m-chlorobenzoate), 2-isoamyl-2-isopropyl-1,3-propylene-glycol di(p-methoxybenzoate), 2-isoamyl-2-isopropyl-1,3-propylene-glycol di(p-methylbenzoate), 2-isoamyl-2-isopropyl-1,3-propylene-glycol monobenzoate monopropionate, 2-isoamyl-2-isopropyl-1,3-propylene-glycol dipropionate, 2-isoamyl-2-isopropyl-1,3-propylene-glycol diacrylate, 2-isoamyl-2-isopropyl-1,3-propylene-glycol dicinnamate, 2,2-diisobutyl-1,3-propylene-glycol dibenzoate, 2-isoamyl-2-isopropyl-1,3-propylene-glycol, 2,2'-biphenyl dicarboxylate, 2-isoamyl-2-isopropyl-1,3-propylene-glycol phthalate, 1,3-diisopropyl-1,3-propylene-glycol di(4-butylbenzoate), 3-methyl-1-trifluoromethyl-2,4-pentandiol dibenzoate, 1,1,1-trifluoro-3-methyl-2,4-pentandiol dibenzoate, 4,4,4-trifluoro-1-(2-naphthyl)-1,3-butandiol dibenzoate, 2-ethyl-2-methyl-1,3-propylene-glycol dipropylformate, 2,4-pentanediol di(p-fluoromethylbenzoate), 4,6-nonandiol dibenzoate, 2,4-pentandiol di(2-furancarboxylate), 2-amino-1-phenyl-1,3-propylene-glycol dibenzoate, 2,2-dimethyl-1,3-propylene-glycol dibenzoate, 3-butyl-3-methyl-2,4-pentandiol dibenzoate, 3,6-dimethyl-2,4-heptandiol dibenzoate, 2,2,6,6-tetramethyl-3,5-heptandiol dibenzoate, 2,3-diisopropyl-1,4-butandiol dibenzoate, 2,3-dimethyl-1,4-butandiol dibenzoate, 2,3-diethyl-1,4-butandiol dibenzoate, 2,3-dibutyl-1,4-butandiol dibenzoate, 2,3-diisopropyl-1,4-butandiol dibutyrate, 2,5-hexandiol dicinnamate, 2,5-dimethyl-2,5-hexandiol dibenzoate, 2,5-dimethyl-2,5-hexandiol dipropionate, 2,5-dimethyl-hexa-3-yne-2,5-diol dibenzoate, hexa-3-yne-2,5-diol dibenzoate, (T) hexa-3-yne-2,5-diol dibenzoate, (S) hexa-3-yne-2,5-diol di(2-furancarboxylate), 1,1-bis(benzoyloxyethyl)cyclohexane 2,2-dimethyl-1,5-pentanediol dibenzoate, 1,5-diphenyl-1,5-pentanediol dibenzoate, 1,5-diphenyl-1,5-pentanediol dipropionate, 2,6-dimethyl-2,6-heptanediol dibenzoate, bis(2-benzoyloxynaphthyl)methane 3,4-dibutyl-1,6-hexandiol dibenzoate, 2,2'-biphenyldimethanol dipivalate, 2,2'-biphenyldimethanol dibenzoate, 2,2'-biphenyldimethanol dipropionate, 2,2'-binaphthyldimethanol dibenzoate, 9,9-bis((m-methoxybenzoyloxy)methyl)fluorene, 9,9-bis((m-chlorobenzoyloxy)methyl)fluorene, 9,9-bis((p-chlorobenzoyloxy)methyl)fluorene, 9,9-bis(cinnamoyloxymethyl)fluorene, 9-(benzoyloxymethyl)-9-(propionyloxymethyl)fluorene, 9,9-bis(propionyloxymethyl)fluorene, 9,9-bis(acryloyloxymethyl)fluorene, and 9,9-bis(pivalyloxymethyl)fluorene.

Specific examples of suitable diether compounds derived are: 1,1-bis(methoxymethyl)-cyclopentadiene; 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)indene; 1,1-bis(methoxymethyl)-2,3-dimethylindene; 1,1-bis(methoxymethyl)-4,7-dimethylindene; 1,1-bis(methoxymethyl)-4-phenyl-2-methylindene; 1,1-bis(methoxymethyl)-7-(3,3,3-trifluoropropyl)indene; 1,1-bis(methoxymethyl)-7-trimethylsilylindene; 1,1-bis(methoxymethyl)-7-trifluoromethylindene; 1,1-bis(methoxymethyl)-7-methylindene; 1,1-bis(methoxymethyl)-7-cyclopentylindene; 1,1-bis(methoxymethyl)-7-isopropylindene; 1,1-bis(methoxymethyl)-7-cyclohexylindene; 1,1-bis(methoxymethyl)-7-tert-butylindene; 1,1-bis(methoxymethyl)-7-tert-butyl-2-methylindene; 1,1-bis(methoxymethyl)-7-phenylindene; 1,1-bis(methoxymethyl)-2-phenylindene; 9,9-bis(methoxymethyl)-fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butylfluorene; 1,1-bis(α-methoxybenzyl)indene; 1,1-bis(1'-methoxyethyl)-5,6-dichloroindene; 9,9-bis(α-methoxybenzyl)fluorene; 9,9-bis(1'-methoxyethyl)fluorene; 9-methoxymethyl-9-(1'-methoxyethyl)-2,3,6,7-tetrafluorofluorene; 9-methoxymethyl-9-pentoxymethylfluorene; 9-methoxymethyl-9-ethoxymethylfluorene; 9-methoxymethyl-9-(1'methoxyethyl)-fluorene; and 9-methoxymethyl-9-[2-(2-methoxypropyl)]-fluorene, 2-methyl,2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)1,3-dimethoxypropane, 2,2-diisobutyl-1,3-dibutoxypropane, 2,2-diisobutyl-1,3-ethoxypropane, 2-isopentyl, 2-isopropyl-1,3-dimethoxypropane, 2,2,4-ttimethyl-1,3-dimethoxypentane, 1.1 min-bismethoxymethylcyclohexane, 2,2 min-bis(methoxymethyl)norbornane, 2-isopropyl-2-3,7-dimethyloctyl-1,3-dimethoxypropane, 2,2-diisopropyl-1,3-dimethoxypropane, 2-isopropyl2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane, 2,2-dicyclohexyl-1,3-dimethoxypropane, 2-isopropyl-2-isobutyl-1,3-dimethoxypropane, and 2,2-dipropyl-1,3-dimethoxypropane.

According to present invention, catalyst component (A) is prepared by contacting magnesium complex (A-1) containing acid salts of group IB-VIIIB elements with a titanium compound (A-3) of the general formula $Ti(OR)_lX'_{4-l}$, wherein X' is a halogen atom; R is a hydrocarbon group having from 1 to 10 carbon atoms, and l is an integer from 0 to 4. Titanium compound (A-4) of the general formula $Ti(OR)_lX'_{4-l}$ can also be employed for the present invention, such as:

[1] titanium tetrahalides, such as $TiCl_4$, $TiBr_4$ and $TiI_4$;

[2] alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$;

[3] dialkoxytitanium dihalides, such as $Ti(OCH_3)_2Cl_2$, $Ti(OC_2H_5)_2Cl_2$, $Ti(O-n-C_4H_9)_2Cl_2$, and $Ti(OC_2H_5)_2Br_2$;

[4] trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$;

[5] tetraalkoxytitaniums, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)$; and

[6] other compounds such as $Ti[O-C(CH_3)CH-CO-CH]_2Cl_2$, $Ti[N(C_2H_5)_2]Cl_3$, $Ti[N(C_6H_5)_2]Cl_3$, $Ti(C_6H_5COO)Cl_3$, $[N(C_4H_9)_4]_2TiCl_6$, $[N(CH_3)_4]Ti_2Cl_9$, $TiBr_4$, $TiCl_3OSO_2C_6H_5$, and $LiTi(OC_3H_7)_2Cl_3$.

Silicon compound (B) represented by the general formulae $SiR_l(OR')_{4-l}$ and $SiR_l(NR2')_{4-l}$, can also be employed as an external electron donor, wherein R is hydrogen; alkyl group or aryl group; R' is alkyl group or aryl group, and m is represented as 0-4. One or more of an electron donor compound (B) can be used either singly or as combined improving the stereo-specificity of the olefin polymers produced. Suitable silicon compounds (B) include alkoxygroup-having organosilicon compounds, nitrogen-containing compounds, phosphorus-containing compounds, and oxygen-containing compounds. Of those, especially preferred are alkoxy group-having and nitrogen-containing organosilicon compounds. Specific examples of these compounds include, but are not limited to, trimethylmethoxysilane, triethylmethoxysilane, dimethyldimethoxysilane, dimethyldiethoxysilane, diphenyldimethoxysilane, dimethyldiethoxysilane, diphenyldimethoxysilane, diphenyldiethoxysilane, dicyclohexyldimethoxysilane, cyclohexylmethyldimethoxysilane, cyclohexyl-iso-butyldimethoxysilane, cyclohexyl-1,1,2-trimethylpropyldimethoxysilane, α-naphthyl-1,1,2-trimethylpropyldimethoxysilane, n-tetradecanyl-1,1,2-trimethylpropyldimethoxysilane, cyclopentylmethyldimethoxysilane, cyclopentylethyldimethoxysilane, cyclopentylpropyldimethoxysilane, cyclopentyl-t-butyldimethoxysilane, cyclopentyl-1,1,2- trimethylpropyldimethoxysilane, dicyclopentyldimethoxysilane, cyclopentylcyclohexyldimethoxysilane, t-butylmethyldimethoxysilane, t-butylethyldimethoxysilane, t-butylpropyldimethoxysilane, di-t-butyldimethoxysilane, diisopropyldimethoxysilane, isopropylisobutyldimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltriisopropoxysilane, vinyltributoxysilane, methyl-t-butoxydimethoxysilane, isopropyl-t-butoxydimethoxysilane, cyclopentyl-t-butoxydimethoxysilane, 1,1,2-trimethylpropyltrimethoxysilane, ethyl silicate, butyl silicate, trimethylphenoxysilane, methyltrialloxysilane, vinyltris(β-methoxyethoxy)silane, vinyltrisacetoxysilane, dimethyltetraethoxydisiloxane, 2 2-(Butylamino)ethanol 4,9-Dibutyl-1,6-dioxa-4,9-diaza-5-sila-spiro[4.4]nonane, 3 2-(Ethylamino)ethanol 4,9-Diethyl-1,6-dioxa-4,9-diaza-5-sila-spiro[4.4]nonane, 4 N-Phenylethanolamine 4,9-Diphenyl-1,6-dioxa-4,9-diaza-5-sila-spiro[4.4]nonane, 5 N-Benzylethanolamine 4,9-Dibenzyl-1,6-dioxa-4,9-diaza-5-sila-spiro[4.4]nonane, 6.alpha.-[2-5,11-Dimethyl-2,8-diphenyl-(Methylamino)ethyl]benzyl 1,7-dioxa-5,11-diaza-6-alcohol sila-spiro[5.5]undecane, 7 (R)-(−)-2-tert-Butylamino-1-4,9-Di-tert-butyl-2,7-phenylethanol diphenyl-1,6-dioxa-4,9-diaza-5-sila-spiro[4.4]nonane, 8 2-(Isopropylamino)-1,2-4,9-Diisopropyl-2,3,7,8-diphenylethanol tetraphenyl-1,6-dioxa-4,9-diaza-5-sila-spiro[4.4]nonane, 4,9-Di-tert-butyl-1,6-dioxa-4,9-diaza-5-sila-spiro[4.4]nonane, 4,9-Di-tert-butyl-1,6-dioxa-4,9-diaza-5-sila-spiro[4.4]nonane, 4,9-Di-tert-butyl-1,6-dioxa-4,9-diaza-5-sila-spiro[4.4]nonane, 4,9-Dibutyl-1,6-dioxa-4,9-diaza-5-sila-spiro[4.4]nonane, 4,9-Diethyl-1,6-dioxa-4,9-diaza-5-sila-spiro[4.4]nonane, 4,9-Diphenyl-1,6-dioxa-4,9-diaza-5-sila-spiro[4.4]nonane, 4,9-Dibenzyl-1,6-dioxa-4,9-diaza-5-sila-spiro[4.4]nonane, 5,11-Dimethyl-2,8-diphenyl-1,7-dioxa-5,11-diaza-6-sila-spiro[5.5]undecane, 4,9-Di-tert-butyl-2,7-diphenyl-1,6-dioxa-4,9-diaza-5-sila-spiro[4.4]nonane, and 4,9-Diisopropyl-2,3,7,8-tetraphenyl-1,6-dioxa-4,9-diaza-5-sila-spiro[4.4]nonane. One or more of these organosilicon compounds may be used herein either singly or as combined.

Organoaluminium compound (C) of the catalyst system of the present invention consists of any of alkyl groups, halogen atoms, hydrogen atoms and alkoxy groups, aluminoxanes, and their mixtures. They may include trialkylaluminiums such as trimethylaluminium, triethylaluminium, triisopropylaluminium, triisobutylaluminium, and trioctylaluminium; dialkylaluminium monochlorides such as diethylaluminium monochloride, diisopropylaluminium monochloride, diisobutylaluminium monochloride, and dioctylaluminium monochloride; alkylaluminium sesquihalides such as ethylaluminium sesquichloride; and linear aluminoxanes such as methylaluminoxanec. Preferred organoaluminium compounds are trialkylaluminiums with lower alkyl groups each having from 1 to 5 carbon atoms, and more preferred are trimethylaluminium, triethylaluminium, triisopropylaluminium, and triisobutylaluminium. One or more of these organoaluminium compounds may be used either singly or as combined. Other acceptable organoaluminium compound (C) includes compounds containing two or more aluminum atoms linked to each other through hetero-atoms, such as:

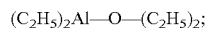

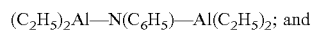

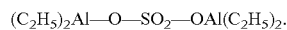

The catalyst system according to present invention is not limited by polymerization process, and polymerization of olefins may be performed in the presence of, or in the absence of, an organic solvent. Olefin monomers may be used in the gaseous or liquid state depending on the polymerization as slurry, liquid or gas phase processes, or in a combination of liquid and gas phase processes using separate reactors, all of which can be done either by batch or continuously. The polyolefin may be directly obtained from gas phase process, or obtained by isolation and recovery of solvent from the slurry process, according to conventionally known methods. The catalyst components (A), (B) and (C), when employed, can be added to the polymerization reactor simultaneously or sequentially. It is preferred to mix components (B) and (C) first and then contact the resultant mixture with component (A) prior to the polymerization. The olefin monomer can be added prior to, with, or after the addition of the Ziegler-Natta type catalyst system to the polymerization reactor. It is preferred to add the olefin monomer after the addition of the Ziegler-Natta type catalyst system.

The catalyst component (A) thus obtained is combined with the aforementioned silicon compound (B) and an organoaluminium compound (C) for the polymerization of olefins. The organoaluminium compound (C) is used in a molar ratio of from 1 to 1000 per atom of titanium in the catalyst component, and the silicon compound(B) is used in a molar ratio of less than 1, preferably from 0.005 to 0.5 per mole of the organoaluminium compound (C). The molecular weight of the polymers may be controlled by known methods, preferably by using hydrogen. With the catalysts produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the Melt Flow Rate (MFR).

There are no particular restrictions on the polymerization conditions for production of polyolefins by the methods of the present invention, such as the polymerization temperature, polymerization time, polymerization pressure, or monomer concentration. The polymerization temperature is generally from about 40° C. to about 90° C., and the polymerization pressure is generally 1 atmosphere or higher. The catalyst systems of the present invention may be pre-contacted with small quantities of olefin monomer, well known in the art as pre-polymerization, in a hydrocarbon solvent at a temperature of about 60° C. or lower for a time sufficient to produce a quantity of polymer from about 0.5 to 3 times the weight of the catalyst. If such a pre-polymerization is done in liquid or gaseous monomer, the quantity of resultant polymer is generally up to 1000 times the catalyst weight.

Examples of olefins homo-polymerized or copolymerized by use of the catalyst component and the catalyst of the present invention include olefins of the general formula CH=CHR, where R is H or $C_{1-18}$ straight or branched alkyl, such as ethylene, propylene, butene-1, pentene-1, 4-methylpentene-1, octene-1, and the like. While the catalyst component and the catalyst of the present invention may be employed in the processes in which ethylene is polymerized, it is more desirable to employ the catalyst component and the catalyst of the present invention in processes in which polypropylene or higher olefins are polymerized. Processes involving the homo-polymerization or copolymerization of propylene are preferred.

EXAMPLES

To facilitate a better understanding of the present invention, the following examples of certain aspects of some embodiments are given. In no way should the following examples be read to limit, or define, the entire scope of the invention.

The solid catalyst composition and polymers in the examples were measured according to the methods described herein. Composition analyses were conducted by ICP emission analysis method to determine metal content in the solid catalyst component.

The solvent insoluble (HI %) of polypropylene (PP) is the weight percentage of heptane insoluble portion in the PP measured by extracting the powdery PP sample using a Soxhlet extractor with heptane solvent for 6 hours.

$^{13}$C NMR characterization was conducted on a Avance 400 MHz spectrometer and polymer solution was made by dissolving in 1,1,2,2-tetrachloroethane-d$_2$. By setting the central line of the triplet of 1,1,2,2-tetrachloroethane-d$_2$ at δ=74.3 ppm downfield of tetramethylsilane (TMS), a logical common origin of the relative chemical shift scale refers to the 1,1,2,2-tetrachloroethane-d$_2$ solvent, disclosed in publications Macromolecules 1997, 30, 6251 and J. Am. Chem. Soc., 1996, 118 (40), 9623. The chemical shift values of typical pentads for methyl and methylene resonances in $^{13}$C NMR spectrums are assigned and calculated. The results of $^{13}$C NMR assignment and calculations are reported in Table 16.

Example 1 a. Preparation of the Catalyst:

11.0 g anhydrous magnesium chloride, 1.47 Iron (II) chloride, 20.0 g anhydrous ethyl alcohol and 250 ml mineral oil was introduced into a 1000 ml reactor with powered stirrer and drawing pipe under inert gas atmosphere. The closed system was heated to 120° C., under stirring and an adduct of MgCl$_2$ with ethyl alcohol was obtained, which is a solution at 120° C. mixed with mineral oil. The closed reactor was brought up to a pressure of 8 psig by introducing nitrogen gas. The valve was opened to allow the mixture to flow through, drawing into a 2 liter vessel containing 800 ml heptane, which was cooled and maintained at a temperature of −40° C. The final temperature of the emulsion discharged into vessel was below 0° C., after collecting the emulsion. The spheroidal solid product in the emulsion was separated by decanting and filtering, and then washed with heptane and dried under vacuum. The foregoing operations were carried out under an atmosphere of nitrogen gas. Totally about 35 g of 10MgCl$_2$.FeCl$_2$.30C$_2$H$_5$OH was obtained.

A Schlenk type reactor equipped with a powered stirrer and a fritted filter disc was used to prepare the catalyst. To the reactor purged with nitrogen, 200 ml TiCl$_4$ was introduced and cooled below −20° C. 7 g of the above spheroidal solid 10MgCl$_2$.FeCl$_2$.30C$_2$H$_5$OH was added slowly and maintained for 10 minutes at this temperature with agitation. The temperature of the mixture was gradually raised to 60° C., and 1.0 g of diisobutyl phthalate was then added. The temperature of the mixture was then increased to 110° C. and maintained for 2 hours with stirring. The resulting solid was filtered and 200 ml TiCl$_4$ was added to the filtered solid. Then the temperature of the mixture was heated to 110° C. and stirred for 2 hours. The residual solid was filtered and washed with anhydrous heptane five times at 60° C., and two times at ambient temperature. The final catalyst was collected and dried under vacuum. The type and amount of metal contained in the solid catalyst components are reported in Table 1.

b. Propylene Slurry Polymerization

Propylene was polymerized using a laboratory scale 2 liter stainless steel autoclave equipped with a stirrer and a jacket for heating and cooling, which was heated to a temperature above 100° C. and expelled all traces of moisture and air with a nitrogen purge. After allowing the reactor to cool to 50° C., under nitrogen, one liter of dry heptane was introduced into the reactor, and then 2.5 mmol of triethyl aluminum and 0.2 mmol diisopropyldimethoxysilane (DIP-donor) were added, and then about 30.0 mg of the solid catalyst was obtained as disclosed above in the heptane suspension and was added successively into the autoclave. The temperature of the autoclave was kept at 50° C. and the pressure of autoclave was raised to 5.0 psig by introducing nitrogen. Hydrogen in a 150 ml vessel with a pressure of 8 psig was flushed into the reactor with propylene.

The reactor temperature was then raised to 70° C. and the total reactor pressure was raised to 90 psig by feeding propylene. The reaction was maintained for 1 hour under this condition with a continuous propylene feed to maintain a constant total pressure during the course of the polymerization. The system was then cooled to 50° C. and vented to reduce the pressure to 0 psig. The reactor was opened and 500 ml methanol was added to the reactor and the resulting mixture was stirred for 5 minutes and then filtered to obtain the polymer product. The obtained polymer was dried under vacuum at 80° C. for 6 hours. The polymer was weighed and tested with percent heptane insoluble (% HI). The activity of catalyst (AC) was also calculated. The results are listed in Table 2.

c. Propylene Bulk Polymerization

A 10-liter stainless steel autoclave was used for propylene bulk polymerization. The autoclave was purged with nitrogen at 90° C. for 1 hour, cooled down to 30° C., and then vacuumed to remove nitrogen. Then 3.6 kg propylene, 15.0 liter hydrogen, 50 ml triethyl aluminum hexane solution (0.6 M) and 5.0 ml diisopropyldimethoxysilane (DIP-donor) heptane solution (0.5 M) were fed into the 10-liter autoclave. With stirring, 60 mg of the catalysts prepared above in a tube connected to the 10-liter reactor was flushed into the reactor with 0.2 kg liquid propylene. The prepolymerization was carried out at 30° C. for 15 minutes. Then, the temperature was raised to 80° C. over a period of 10 minutes, and the polymerization was run at this temperature for 1 hour. The pressure was then relieved and the temperature of the reactor was lowered to ambient temperature. The collected polymer was weighed and tested with percent heptane insoluble (% HI). The activity of catalyst (AC) was also calculated and the results are listed in Table 15.

Example 2

The procedure of Example 1 was followed except that 1.50 g cobalt (II) chloride is used instead of 1.47 g iron (II) chloride. The type and amount of metal contained in the solid catalyst components are reported in Table 1. The results of slurry polymerization are reported in Table 2.

Example 3

The procedure of Example 1 was followed except that 1.50 g nickel (II) chloride is used instead of 1.47 g iron (II)

chloride. The type and amount of metal contained in the solid catalyst components are reported in Table 1. The results of slurry polymerization are reported in Table 2.

Example 4

The procedure of Example 1 was followed except that 1.63 g copper (II) chloride is used instead of 1.47 g iron (II) chloride. The type and amount of metal contained in the solid catalyst components are reported in Table 1. The results of slurry polymerization are reported in Table 2. The results of bulk polymerization are listed in Table 15.

Example 5

The procedure of Example 1 was followed except that 1.46 g manganese (II) chloride is used instead of 1.47 g iron (II) chloride. The type and amount of metal contained in the solid catalyst components are reported in Table 1. The results of slurry polymerization are reported in Table 2. The results of bulk polymerization are listed in Table 15.

Example 6

The procedure of Example 1 was followed except that 1.58 g zinc chloride is used instead of 1.47 g iron (II) chloride. The type and amount of metal contained in the solid catalyst components are reported in Table 1. The results of slurry polymerization are reported in Table 2.

Example 7

The procedure of Example 1 was followed except that 2.50 g iron (II) bromide is used instead of 1.47 g iron (II) chloride. The type and amount of metal contained in the solid catalyst components are reported in Table 1. The results of slurry polymerization are reported in Table 2.

Example 8

The procedure of Example 1 was followed except that 1.76 g iron (II) sulfate is used instead of 1.47 g iron (II) chloride. The type and amount of metal contained in the solid catalyst components are reported in Table 1. The results of slurry polymerization are reported in Table 2.

Example 9

The procedure of Example 1 was followed except that 2.95 g iron (II) perchlorate is used instead of 1.47 g iron (II) chloride. The type and amount of metal contained in the solid catalyst components are reported in Table 1. The results of slurry polymerization are reported in Table 2.

Example 10

The procedure of Example 1 was followed except that 1.88 g iron (III) chloride is used instead of 1.47 g iron (II) chloride. The type and amount of metal contained in the solid catalyst components are reported in Table 1. The results of slurry polymerization are reported in Table 2.

Example 11

The procedure of Example 1 was followed except that the amount of iron (II) chloride is 0.74 g instead of 1.47 g iron (II) chloride. The type and amount of metal contained in the solid catalyst components are reported in Table 1. The results of slurry polymerization are reported in Table 2.

Example 12

The procedure of Example 4 was followed except that the amount of copper (II) chloride is 0.82 g instead of 1.63 g copper (II) chloride. The type and amount of metal contained in the solid catalyst components are reported in Table 1. The results of slurry polymerization are reported in Table 2.

Example 13

The procedure of Example 1 was followed except that 0.71 g Chromium (II) chloride is used instead of 1.47 g iron (II) chloride. The type and amount of metal contained in the solid catalyst components are reported in Table 1. The results of slurry polymerization are reported in Table 2.

Example 14

The procedure of Example 1 was followed except that 1.02 g palladium (II) chloride is used instead of 1.47 g iron (II) chloride. The type and amount of metal contained in the solid catalyst components are reported in Table 1. The results of slurry polymerization are reported in Table 2.

Example 15

The procedure of Example 1 was followed except that 1.43 g praseodymium chloride is used instead of 1.47 g iron (II) chloride. The type and amount of metal contained in the solid catalyst components are reported in Table 1. The results of slurry polymerization are reported in Table 2.

Example 16

The procedure of Example 4 was followed except that the amount of copper (II) chloride is 0.41 g instead of 1.63 g copper (II) chloride. The type and amount of metal contained in the solid catalyst components are reported in Table 1. The results of slurry polymerization are reported in Table 2.

Example 17

The procedure of Example 2 was followed except that the amount of cobalt (II) chloride is 0.38 g instead of 1.50 g cobalt (II) chloride. The type and amount of metal contained in the solid catalyst components are reported in Table 1. The results of slurry polymerization are reported in Table 2.

Example 18

The procedure of Example 1 was followed except that both iron (II) chloride and iron (III) chloride are used to prepare the catalyst together. 1.47 g iron (II) chloride and 1.88 g iron (III) chloride are added. The type and amount of metal contained in the solid catalyst components are reported in Table 1. The results of slurry polymerization are reported in Table 2.

Example 19

The procedure of Example 1 was followed except that both calcium chloride and iron (II) chloride are used to prepare the catalyst together. 1.29 g calcium chloride and 0.98 g iron (II) chloride are added. The type and amount of metal contained in the solid catalyst components are reported in Table 1. The results of slurry polymerization are reported in Table 2.

Example 20

The procedure of Example 1 was followed except that both copper (II) chloride and cobalt (II) chloride are used to prepare the catalyst together. 0.39 g copper (II) chloride and 038 g cobalt (II) chloride are added. The type and amount of metal contained in the solid catalyst components are reported in Table 1. The results of slurry polymerization are reported in Table 2.

Comparative Example 1

The catalyst preparation and polymerization are the same as in Example 1 except that 11.0 g anhydrous magnesium chloride, 20.0 g anhydrous ethyl alcohol and 250 ml mineral oil were introduced into a 1000 ml reactor. The type and amount of titanium contained in the solid catalyst components are reported in Table 1. The results of slurry polymerization are reported in Table 2. The results of bulk polymerization are listed in Table 15.

TABLE 1

| Example | $MX_{2m}$ | $M'Y_{2n}$ (/M"Y'2h) | Mole Ratio M/M' (or/M") | Ti (%) | M' (or M") (%) |
|---|---|---|---|---|---|
| 1 | $MgCl_2$ | $FeCl_2$ | 10/1 | 2.82 | 3.76 |
| 2 | $MgCl_2$ | $CoCl_2$ | 10/1 | 2.56 | 4.21 |
| 3 | $MgCl_2$ | $NiCl_2$ | 10/1 | 2.74 | 3.93 |
| 4 | $MgCl_2$ | $CuCl_2$ | 10/1 | 2.45 | 4.11 |
| 5 | $MgCl_2$ | $MnCl_2$ | 10/1 | 2.76 | 3.69 |
| 6 | $MgCl_2$ | $ZnCl_2$ | 10/1 | 3.21 | 4.43 |
| 7 | $MgCl_2$ | $FeBr_2$ | 10/1 | 3.17 | 3.66 |
| 8 | $MgCl_2$ | $FeSO_4$ | 10/1 | 2.21 | 3.86 |
| 9 | $MgCl_2$ | $Fe(ClO_4)_2$ | 10/1 | 3.15 | 3.21 |
| 10 | $MgCl_2$ | $FeCl_3$ | 10/1 | 3.44 | 3.94 |
| 11 | $MgCl_2$ | $FeCl_2$ | 20/1 | 2.70 | 2.03 |
| 12 | $MgCl_2$ | $CuCl_2$ | 20/1 | 2.39 | 2.34 |
| 13 | $MgCl_2$ | $CrCl_2$ | 20/1 | 3.05 | 1.88 |
| 14 | $MgCl_2$ | $PdCl_2$ | 20/1 | 2.64 | 3.74 |
| 15 | $MgCl_2$ | $PrCl_3$ | 20/1 | 3.11 | 4.26 |
| 16 | $MgCl_2$ | $CuCl_2$ | 40/1 | 2.97 | 1.22 |
| 17 | $MgCl_2$ | $CoCl_2$ | 40/1 | 3.24 | 1.13 |
| 18 | $MgCl_2$ | $FeCl_2/FeCl_3$ | 10/1/1 | 3.35 | 6.12 |
| 19 | $MgCl_2$ | $CaCl_2/FeCl_2$ | 15/1.5/1 | 2.78 | 2.46/2.63 |
| 20 | $MgCl_2$ | $CuCl_2/CoCl_2$ | 40/1/1 | 2.24 | 1.25/1.32 |
| Comp. 1 | $MgCl_2$ | none | none | 2.44 | none |

TABLE 2

| Example | AC (gPP/g Cat · h) | HI (%) |
|---|---|---|
| 1 | 4140 | 96.2 |
| 2 | 3337 | 96.4 |
| 3 | 4083 | 96.7 |
| 4 | 4337 | 98.8 |
| 5 | 5843 | 97.5 |
| 6 | 3260 | 97.2 |
| 7 | 3560 | 95.5 |
| 8 | 3440 | 95.4 |
| 9 | 2960 | 93.0 |
| 10 | 4790 | 96.1 |
| 11 | 3760 | 97.1 |
| 12 | 4427 | 98.1 |
| 13 | 3483 | 95.6 |
| 14 | 4107 | 96.2 |
| 15 | 4687 | 96.7 |
| 16 | 4717 | 97.9 |
| 17 | 3753 | 95.3 |
| 18 | 4420 | 97.0 |
| 19 | 4080 | 96.9 |
| 20 | 4503 | 97.4 |
| Comp. 1 | 5233 | 97.3 |

Example 21

The procedure of Example 4 was followed except that, during the catalyst preparation, when the temperature of the mixture was gradually raised to 60° C., 0.84 g of 9,9-bis (methoxymethyl)fluorene was used instead of 1.0 g diisobutyl phthalate. The type and amount of metal contained in the solid catalyst components are reported in Table 3. The results of slurry polymerization are reported in Table 4. The 10-liter bulk polymerization was conducted by following the procedure of example 1 except that 8.0 liter hydrogen was fed into the 10-liter autoclave instead of 15.0 liter hydrogen. The results of bulk polymerization are listed in Table 15.

Example 22

The procedure of Example 5 was followed except that the amount of manganese (II) chloride is 0.73 g instead of 1.46 g manganese (II) chloride, and that, during the catalyst preparation, when the temperature of the mixture was gradually raised to 60° C., 0.84 g of 9,9-bis(methoxymethyl) fluorene was used instead of 1.0 g diisobutyl phthalate. The type and amount of metal contained in the solid catalyst components are reported in Table 3. The results of slurry polymerization are reported in Table 4.

Example 23

The procedure of Example 14 was followed except that, during the catalyst preparation, when the temperature of mixture was gradually raised to 60° C. and 0.84 g of 9,9-bis(methoxymethyl)fluorene was used instead of 1.0 g diisobutyl phthalate. The type and amount of metal contained in the solid catalyst components are reported in Table 3. The results of slurry polymerization are reported in Table 4.

Comparative Example 2

The catalyst preparation and polymerization are as in comparative example 1 except that during the catalyst preparation, when the temperature of mixture was gradually raised to 60° C., 0.84 g of 9,9-bis(methoxymethyl)fluorene was used instead of 1.0 g diisobutyl phthalate. The type and amount of titanium contained in the solid catalyst components are reported in Table 3. The results of slurry polymerization are reported in Table 4. The 10-liter bulk polymerization was conducted by following the procedure of example 1 except that 8.0 liter hydrogen was fed into the 10-liter autoclave instead of 15.0 liter hydrogen. The results of bulk polymerization are listed in Table 15.

TABLE 3

| Example | MX2m | M'Y2n (/M''Y'2h) | Mole Ratio M/M' (or /M'') | Ti (%) | M' (or M'') (%) |
|---|---|---|---|---|---|
| 21 | MgCl$_2$ | CuCl$_2$ | 10/1 | 2.77 | 3.35 |
| 22 | MgCl$_2$ | MnCl$_2$ | 20/1 | 2.84 | 2.10 |
| 23 | MgCl$_2$ | PdCl$_2$ | 20/1 | 3.21 | 3.56 |
| Comp. 2 | MgCl$_2$ | none | none | 3.61 | none |

TABLE 4

| Example | AC (gPP/g Cat · h) | HI (%) |
|---|---|---|
| 21 | 7983 | 98.6 |
| 22 | 6903 | 97.8 |
| 23 | 6690 | 98.0 |
| Comp. 2 | 7433 | 97.5 |

Example 24

The procedure of Example 4 was followed except that, during the catalyst preparation, when the temperature of mixture was gradually raised to 60° C., 1.1 g of 2,4-pentandiol dibenzoate was used instead of 1.0 g diisobutyl phthalate. The type and amount of metal contained in the solid catalyst components are reported in Table 5. The results of slurry polymerization are reported in Table 6.

Example 25

The procedure of Example 12 was followed except that, during the catalyst preparation, when the temperature of the mixture was gradually raised to 60° C., 1.1 g of 2,4-pentandiol dibenzoate was used instead of 1.0 g diisobutyl phthalate. The type and amount of metal contained in the solid catalyst components are reported in Table 5. The results of slurry polymerization are reported in Table 6.

Comparative Example 3

The catalyst preparation and polymerization are as in comparative example 1 except that during the catalyst preparation, when the temperature of mixture was gradually raised to 60° C., 1.1 g of 2,4-pentandiol dibenzoate was used instead of 1.0 g diisobutyl phthalate. The type and amount of titanium contained in the solid catalyst components are reported in Table 5. The results of slurry polymerization are reported in Table 6.

TABLE 5

| Example | MX2m | M'Y2n (/M''Y'2h) | Mole Ratio M/M' (or /M'') | Ti (%) | M' (or M'') (%) |
|---|---|---|---|---|---|
| 24 | MgCl$_2$ | CuCl$_2$ | 10/1 | 2.43 | 4.12 |
| 25 | MgCl$_2$ | CuCl$_2$ | 20/1 | 2.67 | 2.26 |
| Comp. 3 | MgCl$_2$ | none | none | 3.10 | none |

TABLE 6

| Example | AC (gPP/g Cat · h) | HI (%) |
|---|---|---|
| 24 | 7367 | 98.1 |
| 25 | 6027 | 97.9 |
| Comp. 3 | 8350 | 97.4 |

Example 26 a. Preparation of the Catalyst:

Into a flask were added 5.0 g of anhydrous magnesium chloride, 0.71 copper (II) chloride, 23.0 g 2-ethylhexyl alcohol and 27 ml decane. The mixture was stirred at 130° C. for 3 hours and a homogeneous solution is obtained. To the solution was introduced 1.3 g of phthalic anhydride, and the mixture was stirred at 130° C. for 1 hour and phthalic anhydride was dissolved.

After cooling to room temperature, the resulting solution was dropwise added over one and half hours to 150 ml of titanium tetrachloride kept below −20° C. in a Schlenk type reactor equipped with a powered stirrer and a fitted filter disc. When the addition was finished, the temperature of the resulting mixture was gradually increased to 100° C. over a period of five hours. When the temperature reached 100° C., 2.2 g of diisobutyl phthalate (DIBP) was added to the solution. The resulting mixture was stirred at 110° C. for 2 hours. The hot mixture was then hot filtered at 110° C. To the separated solid was added 180 ml of titanium tetrachloride. The resulting suspension was maintained at 110° C. and stirred for 2 hours. The hot mixture was filtered to separate a solid which was thoroughly washed with decane at 110° C. and hexane at 60° C. until any titanium compound liberating in the filtrate was not detected. The solid catalyst component was dried under vacuum. All the above operations were under nitrogen atmosphere. The types and amounts of metal contained in solid catalyst components are reported in Table 7.

b. Propylene Slurry Polymerization

The slurry polymerizations were conducted by using the same procedure as Example 1. The activity of catalyst (AC) was also calculated. The results are listed in Table 8.

Example 27

The procedure of Example 26 was followed except that the amount of copper (II) chloride is 0.36 g instead of 0.71 g copper (II) chloride. The type and amount of metal contained in solid catalyst components are reported in Table 7. The results of slurry polymerization are reported in Table 8.

Comparative Example 4

The catalyst preparation and polymerization are the same as Example 26 except that 5.0 g of anhydrous magnesium chloride, 23.0 g of 2-ethylhexyl alcohol and 27 ml decane was introduced into a flask. The type and amount of titanium contained in solid catalyst components are reported in Table 7. The results of slurry polymerization are reported in Table 8.

TABLE 7

| Example | MX2m | M'Y2n (/M"Y'2h) | Mole Ratio MM' (or /M") | Ti (%) | M' (or M") (%) |
|---|---|---|---|---|---|
| 26 | MgCl$_2$ | CuCl$_2$ | 10/1 | 2.86 | 4.43 |
| 27 | MgCl$_2$ | CuCl$_2$ | 20/1 | 2.54 | 2.89 |
| Comp. 4 | MgCl$_2$ | none | none | 3.21 | none |

TABLE 8

| Example | AC (gPP/g Cat · h) | HI (%) |
|---|---|---|
| 26 | 3213 | 97.7 |
| 27 | 3147 | 97.9 |
| Comp. 4 | 3123 | 96.7 |

Example 28 a. Preparation of the Catalyst:

To a reactor completely replacing with nitrogen were charged 7.2 g magnesium chloride, 1.0 g copper chloride, 150 ml toluene, 6 ml epoxy chloropropane and 19 ml tributyl phosphate. The mixture was heated and stirred for 3 hours at 55° C., and after magnesium chloride was completely dissolved and a clear solution was obtained, 2.0 g phthalic anhydride was added and the mixture was stirred for one hour. The solution was cooled to below −25° C. and 95 ml titanium tetrachloride was added dropwise over 1.5 hours. The mixture was slowly heated to 80° C. and solid components were formed gradually during the heating. To the system was added 2.7 g diisobutyl phthalate and the system was stirred and kept at 80° C. for one hour. After the mixture was filtered, 100 ml toluene was added and the residue was sufficiently stirred and washed twice at 80° C. The solid precipitate was treated with 100 ml toluene and 60 ml titanium tetrachloride at 100° C. for 2 hours. After filtration, the solid precipitate was sufficiently stirred and washed with 100 ml toluene three times at 100° C. The solid precipitate was treated with 100 ml toluene and 60 ml titanium tetrachloride at 100° C. for 2 hours again. After filtration, the solid precipitate was sufficiently stirred and washed with 100 ml toluene three times at 100° C., and then washed with anhydrous heptane three times at 100° C. and two times at room temperature until no titanium was detected. The solid catalyst was obtained by drying under vacuum. The types and amounts of metal contained in solid catalyst components are reported in Table 9.

b. Propylene Slurry Polymerization

The slurry polymerizations were conducted by using the same procedure as Example 1. The activity of catalyst (AC) was also calculated. The results of slurry polymerization are listed in Table 10.

Example 29

The procedure of Example 28 was followed except that both manganese (II) chloride and copper chloride are used to prepare the catalyst together. 0.96 g manganese (II) chloride and 1.0 g copper chloride are added. The type and amount of metal contained in solid catalyst components are reported in Table 9. The results of slurry polymerization are reported in Table 10.

Example 30

The procedure of Example 28 was followed except that both palladium (II) chloride and copper chloride are used to prepare the catalyst together. 0.27 g palladium (II) chloride and 1.0 g copper chloride are added. The type and amount of metal contained in solid catalyst components are reported in Table 9. The results of slurry polymerization are reported in Table 10.

Comparative Example 5

The catalyst preparation and polymerization are the same as in Example 28 except that 7.2 g magnesium chloride, 150 ml toluene, 6 ml epoxy chloropropane and 19 ml tributyl phosphate were introduced into a reactor. The type and amount of titanium contained in solid catalyst components are reported in Table 9. The results of slurry polymerization are reported in Table 10.

TABLE 9

| Example | MX2m | M'Y2n (/M"Y'2h) | Mole Ratio M/M' (or/M") | Ti (%) | M' (or M") (%) |
|---|---|---|---|---|---|
| 28 | MgCl$_2$ | CuCl$_2$ | 10/1 | 2.08 | 4.13 |
| 29 | MgCl$_2$ | CuCl$_2$/MnCl$_2$ | 10/1/1 | 2.46 | 3.81/3.54 |
| 30 | MgCl$_2$ | CuCl$_2$/PdCl$_2$ | 50/5/1 | 2.77 | 4.13/1.52 |
| Comp. 5 | MgCl$_2$ | none | none | 1.99 | none |

TABLE 10

| Example | AC (gPP/g Cat · h) | HI (%) |
|---|---|---|
| 28 | 5450 | 98.7 |
| 29 | 3040 | 97.9 |
| 30 | 3887 | 98.4 |
| Comp. 5 | 3943 | 98.1 |

Example 31

The procedure of Example 28 was followed except that, during the catalyst preparation, when the temperature of mixture was gradually raised to 80° C., 3.1 g of 2,4-pentandiol dibenzoate was used instead of 2.7 g diisobutyl phthalate. The type and amount of metal contained in solid catalyst components are reported in Table 11. The results of slurry polymerization are reported in Table 12.

Comparative Example 6

The catalyst preparation and polymerization are in the same way as comparative example 4 except that during the catalyst preparation, when the temperature of mixture was gradually raised to 80° C. and 3.1 g of 2,4-pentandiol dibenzoate was used instead of 2.7 g diisobutyl phthalate. The type and amount of titanium contained in solid catalyst components are reported in Table 11. The results of slurry polymerization are reported in Table 12.

TABLE 11

| Example | MX2m | M'Y2n (/M"Y'2h) | Mole Ratio M/M' (or/M") | Ti (%) | M' (or M") (%) |
|---|---|---|---|---|---|
| 31 | MgCl$_2$ | CuCl$_2$ | 10/1 | 2.58 | 4.35 |
| Comp. 6 | MgCl$_2$ | none | none | 2.67 | none |

TABLE 12

| Example | AC (gPP/g Cat · h) | HI (%) |
|---|---|---|
| 31 | 9583 | 98.3 |
| Comp. 6 | 8963 | 97.8 |

Example 32

The procedure of Example 28 was followed except that, during the catalyst preparation, when the temperature of mixture was gradually raised to 80° C., 2.8 g of 9,9-bis (methoxymethyl)fluorene was used instead of 2.7 g diisobutyl phthalate. The type and amount of metal contained in solid catalyst components are reported in Table 13. The results of slurry polymerization are reported in Table 14.

Comparative Example 7

The catalyst preparation and polymerization are the same as in comparative example 4 except that during the catalyst preparation, when the temperature of mixture was gradually raised to 80° C., 2.8 g of 9,9-bis(methoxymethyl)fluorene was used instead of 2.7 g diisobutyl phthalate. The type and amount of titanium contained in solid catalyst components are reported in Table 13. The results of slurry polymerization are reported in Table 14.

TABLE 13

| Example | MX2m | M'Y2n (/M"Y'2h) | Mole Ratio M/M' (or/M") | Ti (%) | M' (or M") (%) |
|---|---|---|---|---|---|
| 32 | MgCl$_2$ | CuCl$_2$ | 10/1 | 3.14 | 4.37 |
| Comp. 7 | MgCl$_2$ | none | none | 3.42 | none |

TABLE 14

| Example | AC (gPP/g Cat · h) | HI (%) |
|---|---|---|
| 32 | 5100 | 97.8 |
| Comp. 7 | 5800 | 97.3 |

TABLE 15

| Example | AC (KgPP/g Cat.) | HI (%) |
|---|---|---|
| 4 | 1.80 | 99.1 |
| 5 | 1.67 | 97.9 |
| 21 | 1.77 | 98.3 |
| Comp. 1 | 2.47 | 98.5 |
| Comp. 2 | 2.02 | 97.7 |

TABLE 16

| Peak range (δ ppm) | δ (ppm3) | Sample 21 Fraction (%) | Comp. 2 Fraction (%) |
|---|---|---|---|
| 22.6-21.7 | mmmm | 95.7 | 93.0 |
| 21.7-21.4 | mmmr | 1.7 | 3.1 |
| 21.4-21.2 | rmmr | 0.2 | 0.5 |
| 21.2-21.0 | mmrr | 0.9 | 1.3 |
| 21.0-20.7 | mmrm + rmrr | 0.4 | 0.7 |
| 20.5-20.3 | rrrr | 0.4 | 0.4 |
| 20.3-20.0 | rrrm | 0.3 | 0.5 |
| 20.0-19.8 | mrrm | 0.4 | 0.5 |

As the data in tables 1 to 16 demonstrate, the polymerization of olefins using catalysts prepared from component (A) prepared in the examples fulfill the requirements of present invention, and with silicon compound (B) and organoaluminium compound (C), makes it possible to achieve a polyolefin catalyst system having high stereoregularity and high polymerization activity with high yield. The produced polymers demonstrate improved isotacticity at high activities compared with the comparative examples. As demonstrated in the examples 4, 21 and 24 and comparative examples 1, 2 and 3, the polymers prepared using the catalyst components of the present invention exhibit higher HI % (heptane insoluble), which is consistent with the $^{13}$C NMR data of examples 21 and comparative examples 2 listed in table 16. Heptane insoluble (HI %) and $^{13}$C NMR results of resonances associated with different pentads exhibit the improved solvent insolubility and isotacticity.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention. Whenever a numerical range with a lower limit and an upper limit is disclosed, and number falling within the range is specifically disclose. Moreover, the indefinite articles "a" or "an", as use in the claims, are defined herein to mean one or more than one of the element that it introduces.

What is claimed is:

1. A method for preparing a catalyst component (A) for polymerizing or copolymerizing an α-olefin comprising:
   contacting or mixing a magnesium complex (A-1), an internal electron donor (A-2), and a titanium compound (A-3);
   wherein the magnesium complex (A-1) contains acid salts of group IB-VIIIB elements formed by contacting a magnesium halide either as a solid or in a liquid medium represented by formula $MgX_n(OR)_{2-n}$ with an acid salt solution of group IB-VIIIB metals represented by formula $M_mY_p$; wherein X is selected from F$^-$, Cl$^-$, Br$^-$, I$^-$, NO$_3^-$, NO$_2^-$, R$^1$COO$^-$, SO$_4^{2-}$ ClO$_3^-$, BrO$_3^-$, IO$_3^-$, ClO$_4^-$, and R'(COO)$_2^{2-}$; M is at least one metal selected from group IB-VIIIB; Y is an acid radical such as Cl$^-$, Br$^-$, I$^-$, NO$_3^-$, NO$_2^-$, R$^1$COO$^-$, SO$_4^{2-}$ ClO$_3^-$, BrO$_3^-$, IO$_3^-$, ClO$_4^-$, and R'(COO)$_2^{2-}$; R, R', and R" are hydrocarbon groups having from 1 to 10 carbon atoms, and n is an integer from 0 to 2; m and p are numbers from 1.0 to 5.0;

wherein the internal electron donor (A-2) is a diester or diether or composite compounds; and wherein the titanium compound (A-3) is of the general formula $Ti(OR)_l X'_{4-l}$, wherein X' is a halogen atom and R is a hydrocarbon group having from 1 to 10 carbon atoms, and l is a number from 0 to 4.

2. The process of claim 1, wherein a surface active agent is added at any time in the course of the preparation.

3. The method of claim 1, wherein the magnesium complex (A-1) is prepared by dissolving the magnesium halide and the acid salt solution in a solvent mixture of an organic epoxy compound and an organic phosphorus compound to form a homogeneous solution.

4. The method of claim 3, wherein the organic epoxy compound is selected from the group consisting of oxides of aliphatic olefins and diolefins; oxides of halogenated aliphatic olefins and diolefins; and glycidyl ethers.

5. The method of claim 3, wherein the organic epoxy compound is selected from the group consisting of ethylene oxide, propylene oxide, butylene oxide, butadiene oxide, butadiene dioxide, epoxy chloropropane, methyl glycidyl ether, and diglycidyl ether.

6. The method of claim 3, wherein the organic phosphorus compound is selected from the group consisting of trimethyl phosphate, triethyl phosphate, tributyl phosphate, triphenyl phosphate, trimethyl phosphite, triethyl phosphite, tributyl phosphite and triphenyl phosphite.

7. The method of claim 1, wherein the magnesium complex (A-1) is prepared by dissolving the magnesium halide and the acid salt solution in a solvent mixture of alcohol and hydrocarbon or aromatic hydrocarbon solvents.

8. The method of claim 1, wherein the magnesium complex (A-1) is prepared in the form of spherical particles derived from alcohol adducts.

9. The method of claim 1, wherein the acid salt is selected from Cerium (III) fluoride, cerium (III) chloride, cerium (III) bromide, cerium (III) iodide, chromium (II) fluoride, chromium (II) chloride, chromium (II) bromide, chromium (II) iodide, chromium (III) fluoride, chromium (III)chloride, chromium (III)bromide, chromium (III) iodide, chromium (III) nitrate, cobalt (II) fluoride, cobalt (II) chloride, cobalt (II) bromide, cobalt (II) iodide, copper (II) fluoride, copper (II) chloride, copper (II) bromide, copper (II) iodide, copper (II) nitrate, dysprosium (II) chloride, dysprosium (II) bromide, dysprosium (II) iodide, dysprosium (III) fluoride, dysprosium (III) chloride, dysprosium (III) bromide, dysprosium (III) iodide, erbium fluoride, erbium chloride, erbium bromide, erbium iodide, erbium nitrate, europium (II) fluoride, europium (II) chloride, europium (II) bromide, europium (II) iodide, europium (III) fluoride, europium (III) chloride, europium (III) bromide, europium (III) iodide, gadolinium (II) chloride, gadolinium (III) fluoride, gadolinium (III) chloride, gadolinium (III) bromide, gadolinium (III) iodide, gadolinium (III) nitrate, gold (III) fluoride, gold (III) chloride, gold (III) bromide, gold (III) iodide, holmium fluoride, holmium chloride, holmium bromide, holmium iodide, iron (II) fluoride, iron (II) chloride, iron (II) bromide, iron (II) iodide, iron (III) fluoride, iron (III) chloride, iron (III) bromide, iron (III) iodide, iron (II) nitrate, iron (III) nitrate, Iron (II) sulfate, Iron (II) perchlorate, lanthanum fluoride, lanthanum chloride, lanthanum bromide, lanthanum iodide, lanthanum nitrate, lutetium fluoride, lutetium chloride, lutetium bromide, lutetium iodide, manganese (II) fluoride, manganese (II) chloride, manganese (II) bromide, manganese (II) iodide, manganese (II) acetate, manganese (II) nitrate, molybdenum (II) fluoride, molybdenum (II) chloride, molybdenum (II) bromide, molybdenum (II) iodide, molybdenum (III) fluoride, molybdenum (III) chloride, molybdenum (III) bromide, molybdenum (III) iodide, neodymium fluoride, neodymium chloride, neodymium bromide, neodymium iodide, neodymium nitrate, nickel (II) fluoride, nickel (II) chloride, nickel (II) bromide, nickel (II) iodide, nickel (II) nitrate, niobium (III) fluoride, niobium (III) chloride, niobium (III) bromide, osmium (III) chloride, osmium (III) bromide, palladium (II) fluoride, palladium (II) chloride, palladium (II) bromide, palladium (II) iodide, palladium (II) nitrate, praseodymium fluoride, praseodymium chloride, praseodymium bromide, praseodymium iodide, praseodymium nitrate, rhenium (III) fluoride, rhenium (III) chloride, rhenium (III) bromide, rhenium (III) iodide, rhodium (III) fluoride, rhodium (III) chloride, rhodium (III) bromide, rhodium (III) iodide, rubidium fluoride, rubidium chloride, rubidium bromide, rubidium iodide, rubidium nitrate, ruthenium (III) fluoride, ruthenium (III) chloride, ruthenium (III) bromide, ruthenium (III) iodide, samarium (II) fluoride, samarium (II) chloride, samarium (II) bromide, samarium (II) iodide, samarium (III) fluoride, samarium (III) chloride, samarium (III) bromide, samarium (III) iodide, scandium fluoride, scandium chloride, scandium bromide, scandium iodide, scandium nitrate, thulium fluoride, thulium chloride, thulium bromide, thulium iodide, thulium nitrate, tungsten (II) chloride, tungsten (II) bromide, tungsten (II) iodide, tungsten (III) bromide, tungsten (III) iodide, vanadium (II) fluoride, vanadium (II) chloride, vanadium (II) bromide, vanadium (II) iodide, vanadium (III) fluoride, vanadium (III) chloride, vanadium (III) bromide, vanadium (III) iodide, ytterbium (II) chloride, ytterbium (II) bromide, ytterbium (II) iodide, ytterbium (III) fluoride, ytterbium (III) chloride, yttrium fluoride, yttrium chloride, yttrium bromide, yttrium nitrate, zinc fluoride, zinc chloride, zinc bromide, zinc iodide, zinc nitrate, zinc acetate, zinc chlorate, zinc perchlorate, and zirconyl chloride.

10. The method of claim 1, wherein the diester is selected from diacid and diol.

11. The method of claim 1, wherein the diester is selected from diesters of phthalic acid, naphthalene dicarboxylic acid, malic acid, succinic acid, and Glutaric acid.

12. The method of claim 1, wherein the diester is selected from diesters of 1,2-diols, 1,3-diols, 1,4-diols, and 1,5-diols.

13. The method of claim 1, wherein the diether is selected from diethers of 1,2-diols, 1,3-diols, 1,4-diols, and 1,5-diols.

\* \* \* \* \*